United States Patent
Haiut (10) Patent No.: US 9,859,791 B2
(45) Date of Patent: Jan. 2, 2018

(54) HIGH EFFICIENCY HIGH VOLTAGE CHARGE PUMP ACTUATOR FOR CAPACITIVE LOAD

(71) Applicant: DSP Group Ltd., Herzliya (IL)

(72) Inventor: Moshe Haiut, Ramat Gan (IL)

(73) Assignee: DSP GROUP LTD., Herzliya (IL)

( * ) Notice: Subject to any disclaimer, the term of this patent is extended or adjusted under 35 U.S.C. 154(b) by 0 days.

(21) Appl. No.: 15/355,062

(22) Filed: Nov. 18, 2016

(65) Prior Publication Data

US 2017/0222547 A1   Aug. 3, 2017

Related U.S. Application Data (60) Provisional application No. 62/257,247, filed on Nov. 19, 2015.

(51) Int. Cl.
| | |
|---|---|
| *H02M 3/07* | (2006.01) |
| *H02H 7/00* | (2006.01) |
| *B23K 11/24* | (2006.01) |
| *H02M 1/42* | (2007.01) |

(52) U.S. Cl.
CPC ..................... *H02M 3/07* (2013.01)

(58) Field of Classification Search
CPC .......... H02M 3/07; H03H 7/20; H03H 11/02; H03H 11/20; H03G 3/10; G06G 7/12
USPC .............. 327/148, 157, 534–537; 363/59, 60
See application file for complete search history.

(56) References Cited

U.S. PATENT DOCUMENTS

| | | | |
|---|---|---|---|
| 2003/0137284 A1* | 7/2003 | DiPiazza .................. | H03H 7/20 323/212 |
| 2008/0165457 A1* | 7/2008 | Premerlani ........ | H01H 59/0009 361/31 |
| 2011/0254637 A1* | 10/2011 | Manssen .................. | H03H 7/40 333/2 |
| 2015/0061944 A1* | 3/2015 | Boire ..................... | H01Q 5/335 343/702 |
| 2015/0226556 A1* | 8/2015 | Aaltonen ........... | G01C 19/5712 73/504.12 |

(Continued)

*Primary Examiner* — Brandon S Cole
(74) *Attorney, Agent, or Firm* — Reches Patents (57) ABSTRACT

A method for charge-reuse, the method may include performing multiple repetitions of the steps of: operating a second capacitive load while the second capacitive load is disconnected from a first capacitive load; wherein the second capacitive load is a Microelectromechanical systems (MEMS) capacitive load or a Nanoelectromechanical systems (NEMS) capacitive load; electrically coupling a first capacitive load to a second capacitive load via a path that comprises an inductor; charging the first capacitive load with a second charge provided from the second capacitive load; electrically disconnecting the first capacitive load, the second capacitive load and the inductor from each other; feeding the inductor with a supply current provided by a supply circuit; disconnecting the inductor from the supply circuit and coupling the inductor to the first capacitive load; charging the first capacitive load by the inductor; electrically coupling the first capacitive load to the second capacitive load via the path that comprises the inductor; charging the second capacitive load with a first charge provided from the first capacitive load; and operating the second capacitive load while the second capacitive load is disconnected from the first capacitive load.

22 Claims, 6 Drawing Sheets

(56) References Cited

U.S. PATENT DOCUMENTS

2016/0277832 A1* 9/2016 Kupershmidt ............ H04R 3/00
2017/0047904 A1* 2/2017 Szopko ................ H04B 1/0057

* cited by examiner

HIGH EFFICIENCY HIGH VOLTAGE CHARGE PUMP ACTUATOR FOR CAPACITIVE LOAD

CROSS REFERENCE

This application claims the benefit of U.S. provisional patent 62/257,247 filing date Nov. 19 2015, which is incorporated herein by reference.

BACKGROUND

Figure 1:
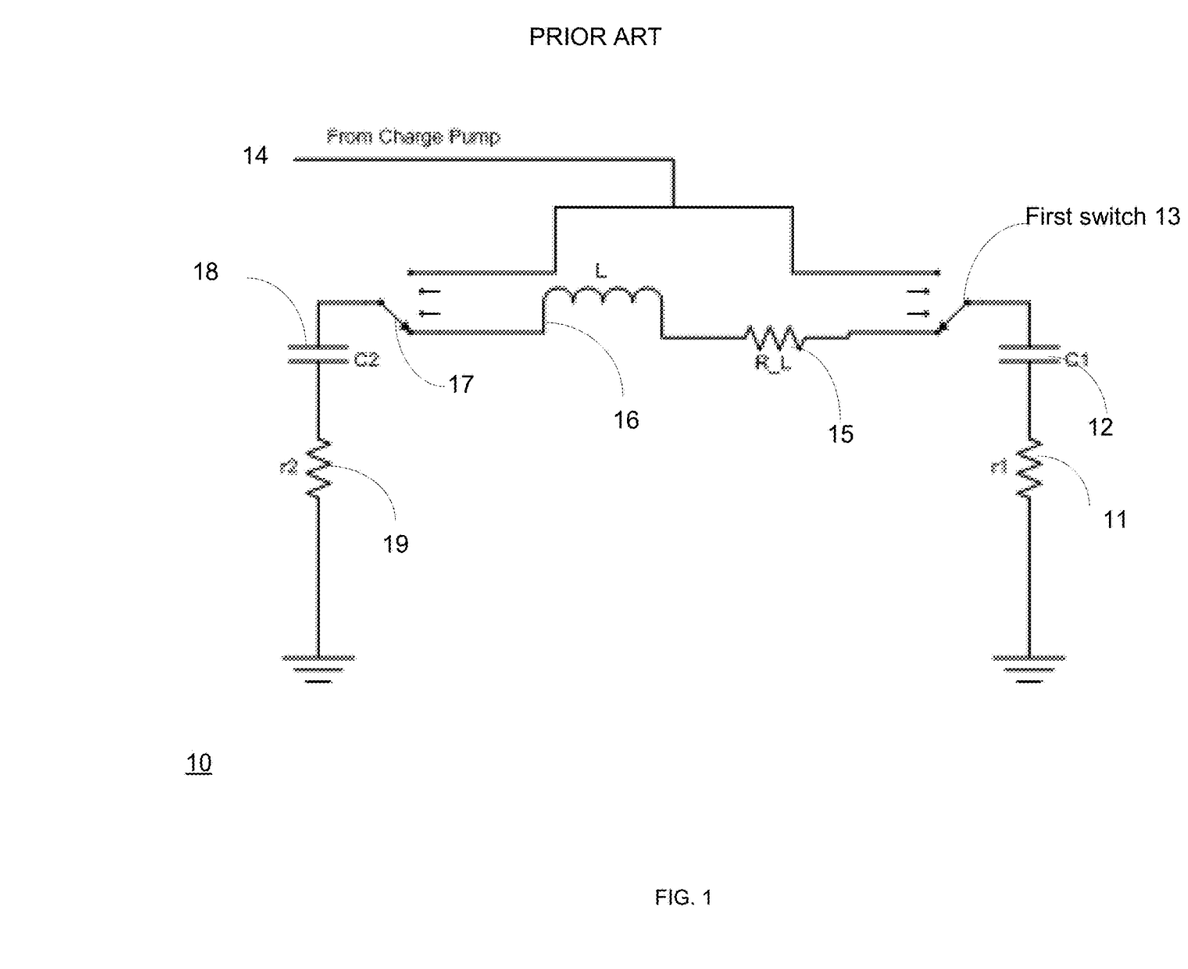
FIG. 1 illustrates a prior art model.

FIG. 1 illustrates a model 10 of a prior art circuit. The modeled circuit includes a capacitive load (such as a membrane) that is connected to a capacitor (which may also be another membrane (or another capacitive load)), using a charge reuse mechanism.

The model 10 includes first resistor R1 11, first capacitor C1 12, first switch 13, input 14 from charge pump, second resistor R2 19, second capacitor C2 18, second switch 17, inductor L 16 and inductor parasitic resistor 15.

Inductor L 16 and inductor parasitic resistor 15 are serially connected to each other.

First resistor R1 11 and first capacitor C1 12 are serially connected between the ground and an input port of first switch 13.

Second resistor R2 19, second capacitor C2 18 are serially connected between the ground and an input port of second switch 17.

First switch 13 may connect R1 11 and C1 12 to the input 14, to inductor L 16 and inductor parasitic resistor 15 or maintain R1 11 and C1 12 disconnected.

Second switch 17 may connect R2 19 and C2 18 to the input 14, to inductor L 16 and inductor parasitic resistor 15 or maintain R2 19 and C2 18 disconnected.

The charge-reuse mechanism allows reusing the capacitive load electric charge. Assume the capacitive load is the second capacitor C2 18 with initially 0 v, and C1 of equal capacitance contains initial charge Q with voltage level of 100 v. Also assume that capacitive load capacitance is 50 pF and that the required capacitive load frequency is 500 KHz. A simple calculation shows that charging the capacitive load from 0 v to 100 v from a power source and discharging from 100 v to ground and vice versa would consume average power of at least 125 mW from the power source (this calculation is based on the capacitor potential energy $E=V^2C/2$). The prior art circuit suggests that capacitive load charging is done by just turning-on the appropriate switch and letting the charge Q flow from C1 to the capacitive load C2 through inductance L. It can be shown that in the ideal case of 0 pure resistance and initial condition of 0 v on C2 all the charge Q will move from C1 to C2 and then the inductance current will change direction. If the switch is then turned off and then turned on again after 1 uS and so on, the 0 v/100 v square wave of 500 KHz will appear on the capacitive load—theoretically without consuming power from the power source. Anyway, since there is parasitic resistance in the circuit (as shown in FIG. 1), the inductor current will change direction too early (i.e. before full charge exchange occurs), which will require refreshment of both capacitors to initial charge condition after every capacitive load cycle (or half-cycle). This is done by discharging the source capacitor to 0 v and adding more charge to the destination capacitor to reach full initial voltage (100 v). This compensation consumes power from the power source, but this time the average power can be much lower than the 125 mW that would be consumed without the charge-reuse mechanism. Actually the power consumption from power source when charge-reuse is used is limited to only cover the power dissipation by the parasitic resistors and capacitive load motion (e.g. if C2 represents a MEMS membrane there is electric power lose due to small dynamic changes of capacitive load capacitance as a result of membrane displacement).

When coming to implement the charge-reuse schematic of FIG. 1 another issue is raised: How to initialize the voltages of the two capacitors after every cycle. Discharging the residual charge to 0 v in one capacitor is easy, but the main problem is to set the high voltage on the other capacitor (e.g. from 98 v to 100 v). If the power source is of a low-voltage it requires some means of charge pump.

There is a need to provide a low-cost power-efficient charge pump mechanism that enables the design of a highly efficient charge-reuse actuator in MEMS devices.

SUMMARY

There may be provided a method and/or a device for charge re-use as illustrated in the specification and/or the claims.

BRIEF DESCRIPTION OF THE INVENTION

The present invention will be understood and appreciated more fully from the following detailed description taken in conjunction with the drawings in which.

DETAILED DESCRIPTION OF THE INVENTION

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Various non-limiting examples of capacitive loads (except a membrane) include (a) Micro-mirrors (e.g. http://www.laserfocusworld.com/articles/print/volume-51/issue-07/feature/micro-beam-steering-precision-micro-beam-steering-systems-simplify-move-to-handheld-instruments.html), with both electrostatic and piezo actuation schemes; (b) Inertial sensors and gyros using electrostatic or piezo actuation (See for example http://www.ece.gatech.edu/research/integrated-mems/documents/Ayazi_Inertial_IEEE.pdf, http://proceedings.spiedigitallibrary.org/proceeding.aspx-?articleid=1012866); (c) RF switches with electrostatic actuation, (http://www.mouser.com/pdfdocs/Omron_RF-MEMSSwitch_Whitepaper_finalsm-3.pdf), (d) Microfluidic actuators (http://www.sciencedirect.com/science/article/pii/S0924424712001707).

There is provided a low-cost power-efficient charge pump mechanism that enables the design of a highly efficient charge-reuse capacitive load actuator in a MEMS device.

Referring again to the schematic of FIG. 1. Assume that there is a controller that controls the serial switch to allow transfer of charge from one capacitor to the other (and hence producing a square wave voltage of a specified frequency over the capacitive load C2). It is required that the same controller should control the timing of the invented charge pump to first produce a current pulse via the inductor L which is then directed to the first capacitor C1 to complement its charge for full voltage at the end of each cycle and before beginning the second cycle. To do that, the low-voltage battery is connected (via an appropriate switch) to the inductor to replace the capacitive load second capacitor C2, while the other terminal of the inductor is disconnected from the first capacitor C1 and shorted to 0 v ground. This state of building-up the inductor L current continues for a pre-programmed time, and then the controller disconnects the inductor L from ground and re-connects it to the first capacitor C1 until the inductor current vanishes to 0. During this time the remainder charge in second capacitor C2 (capacitive load) is discharged to 0 v via a special switch to ground to prepare for the next cycle. It can be shown that the capacitive load voltage amplitude in the long run can be controlled via determining the programmable time duration when the inductor current is built-up by the battery.

Figure 2:
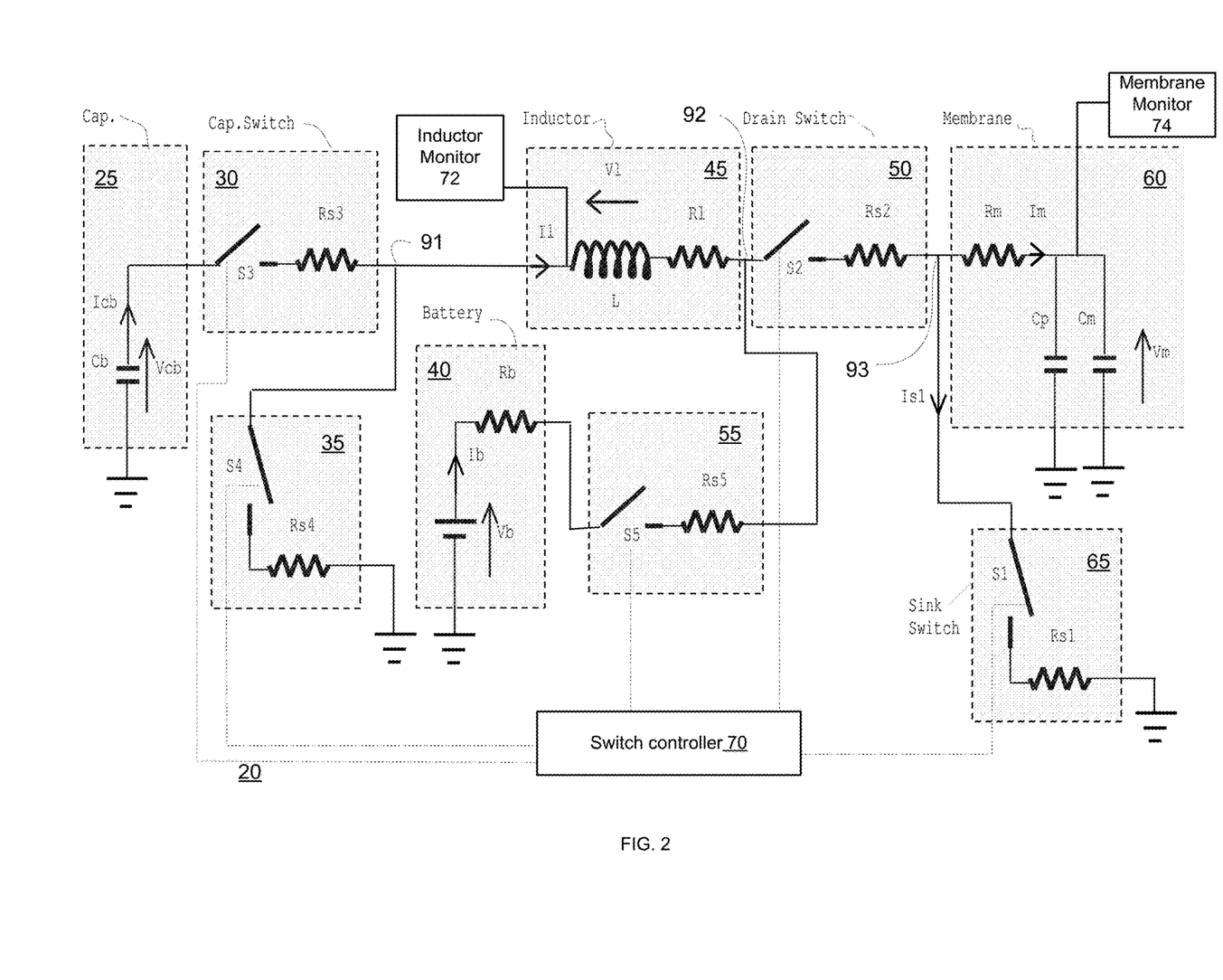
FIG. 2 illustrates a model of a circuit according to an embodiment of the invention.

FIG. 2 is a model 20 of a circuit according to an embodiment of the invention.

In model 20 capacitive load 60 is represented by capacitive load capacitance Cm and capacitive load parasitic capacitance Cp, Cm and Cp are connected in parallel to each other and are grounded. Capacitances Cm and Cp are connected in series to capacitive load resistor Rm that forms an input port of capacitive load 60. Usually Cp is greater than Cm.

Rm is connected, via junction 93 to drain switch 50 and to sink switch 65.

Inductor 45 is connected, via junction 92 to drain switch 50 and to fifth switch 55. Capacitor switch 30 is connected, via junction 91, to inductor 45 and to fourth switch 35. Capacitor 25 is connected to capacitor switch 30. Battery 40 is connected to fifth switch 55.

Capacitor 25 is represented by Cb, where current Icb and voltage Vcb are related to this capacitor.

Capacitor switch 30 is represented by S3 and a serial parasitic resistor Rs3. Each one of the five switches has its own serial parasitic resistance (e.g. S3 has the parasitic serial resistance Rs3).

Fourth switch 35 is represented by serially connected S4 and Rs4.

Battery 40 is represented by serially connected voltage source Vb and Rb. Current Ib flows through Rb. Vb is the power source of the capacitive load actuator—it's a low voltage source (e.g. 3 volts).

Fifth switch 55 is represented by serially connected S5 and Rs5.

Inductor 45 is represented by serially connected inductor L and R1. I1 flows through L and V1 falls on L. L is the charge-reuse inductor.

Drain switch 50 is represented by serially connected S2 and Rs2.

Sink switch 65 is represented by serially connected S1 and Rs1.

Cb is the charge-reuse capacitor (Cb=Cp+Cm)

Figure 3:
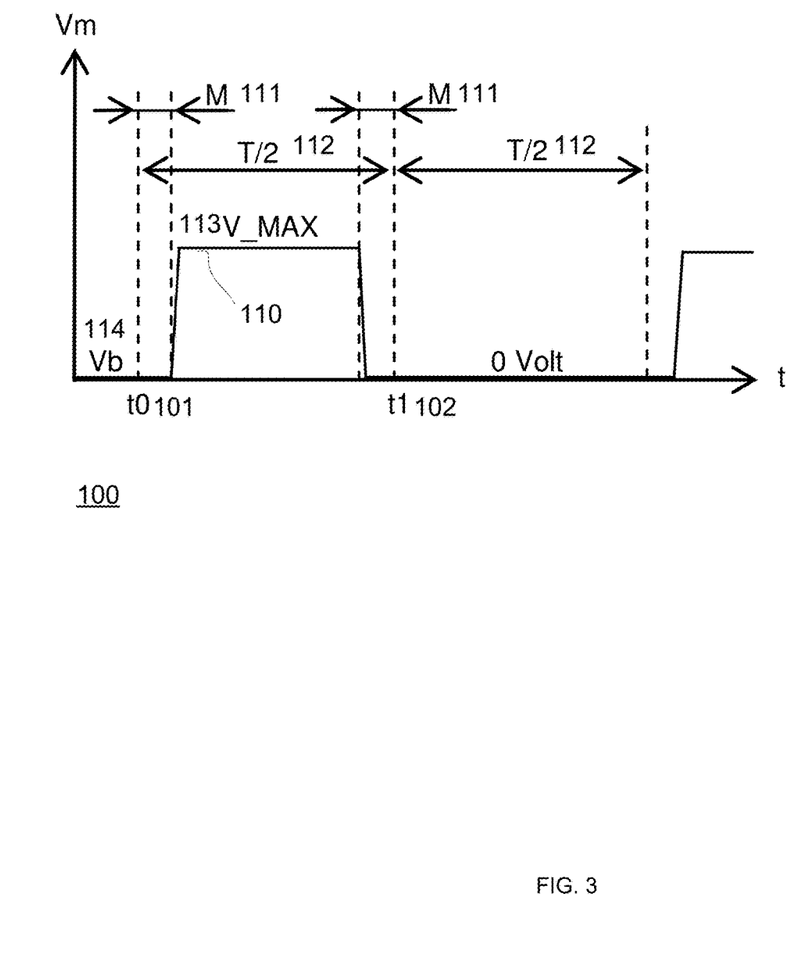
FIG. 3 is a timing diagram according to an embodiment of the invention.
Figure 4:
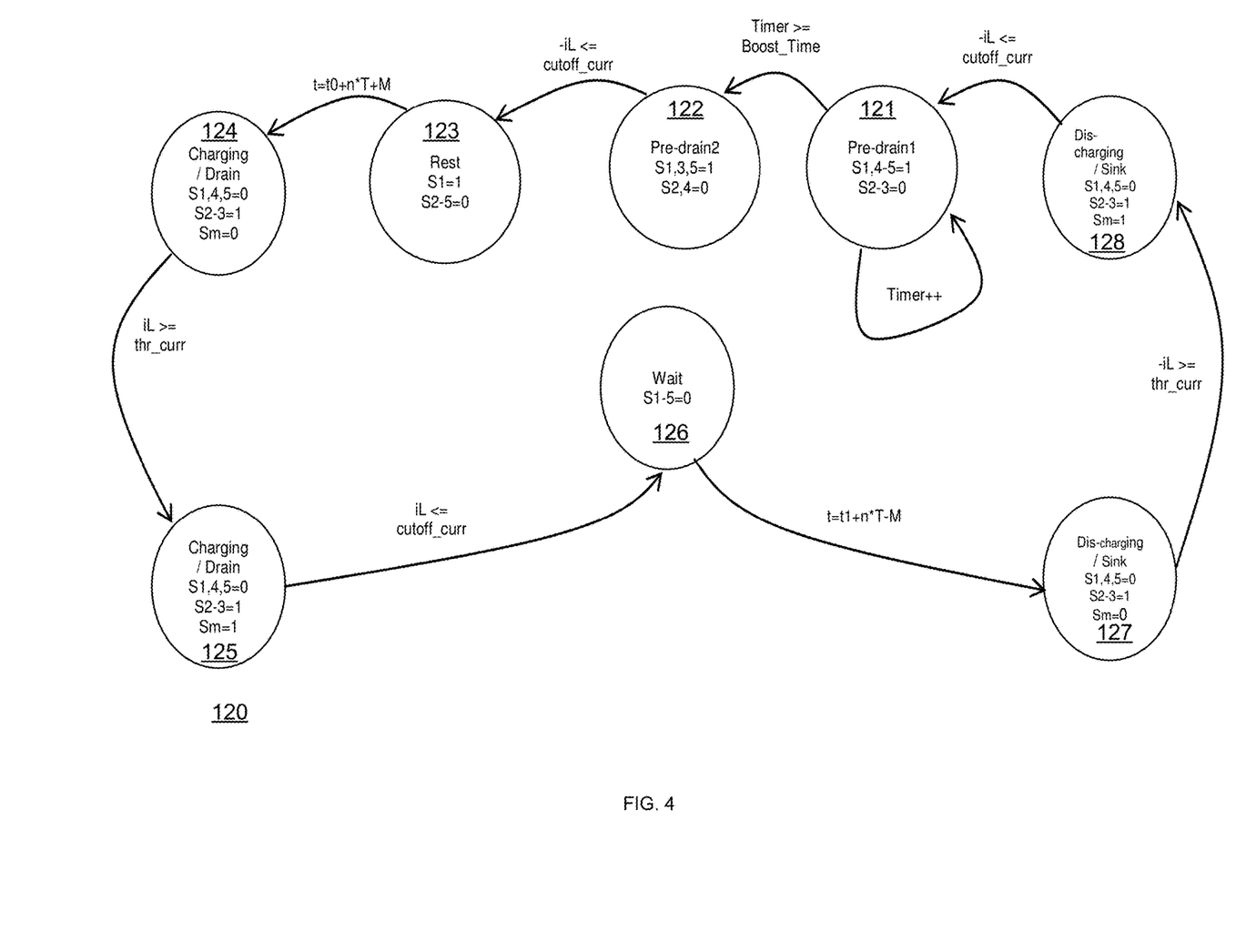
FIG. 4 is a state machine according to an embodiment of the invention.

FIG. 3 is a timing diagram and FIG. 4 is state machine that controls the switches S1, S2, S3, S4, and S5 ('0'=open, '1'=closed) in a repetitive sequence to produce the square wave voltage signal (denoted 110 in FIG. 3) on the capacitive load Cm. The square pulse has a peak voltage of V_MAX 113.

Referring to FIG. 3:

a. T is the period of the actuator square wave. In FIG. 3 there are two halves of T that are denoted T/2 112.

b. M 111 is a time interval that defines the duty-cycle of the square wave c. Sm is an auxiliary variable of the state machine to split certain states into two sub-states to facilitate implementation issues.

To make its decisions, the controller 70 (FIG. 2, when applying the state machine) uses the outputs of two circuits—inductor current monitor 72 that monitors the inductor current and compares it to pre-defined values, and capacitive load monitor 74 that determines the capacitive load peak voltage.

The constant Boost_Time (FIG. 4) is controlled by the controller 70, and determines the capacitive load voltage amplitude in the steady state, as it has a direct effect on the magnetic energy of the inductor prior to discharging this energy into the capacitor Cb. This energy that is delivered to the capacitor Cb just before the beginning of any one cycle is intended for compensating for the lost energy during the previous cycle. Upon receiving this energy from the inductor, the Cb capacitor returns to its original high voltage (e.g. its voltage changes from 98 v back to the original 100 v).

The following list describes the switches position in the various states of the state-machine, and the voltage and current equations that are derived from the switches position:

Rest state 123: S1=closed S2-5=open
I1=Icb=Ib=0

$$Im=-Is1=(Cp+Cm)*d/dt(Vm)=Vm/(Rm+Rs1)$$

Pre-drain1 state 121: S1,4-5=closed S2,3=open
Icb=0

$$Ib=-I1=(Vb+V1)/(Rb+Rs5+R1+Rs4)$$

$$Im=-Is1=(Cp+Cm)*d/dt(Vm)=Vm/(Rm+Rs1)$$

$$d/dt(I1)=V1/L$$

Pre-drain2 state 122: S1,3,5=closed S2,4=open $$dVcb/dt=-Icv/Cb$$

$$Ib=-I1=-Icb=(Vb+V1-Vcb)/(Rb+Rs5+R1+Rs3)$$

$$Im=-Is1=(Cp+Cm)*d/dt(Vm)=Vm/(Rm+Rs1)$$

$$d/dt(I1)=V1/L$$

Drain state: S1,4,5=open S2-3=closed
Ib=Is1=0

$$Icb=I1=Im=(Cp+Cm)*d/dt(Vm)=(Vcb-V1-Vm)/(Rs3+R1+Rs2+Rm)$$

$$dVcb/dt=-Icv/Cb$$

$$d/dt(I1)=V1/L$$

$$Qm=Vm*(Cp+Cm)$$

Wait state 126: S1-5=open
Ib=Icb=I1=Im=Is1=0

Note that the "Drain state" is split in the diagram of FIG. 4 into four different states called "Charging/Drain" and "Discharging/Sink" and depending on the internal auxiliary variable Sm. Especially:

a. "Charging/Drain" with Sm=0 state 124
b. "Charging/Drain" with Sm=1 state 125
c. "Discharging/Sink" with Sm=0 state 127
d. "Discharging/Sink" with Sm=1 state 128

This is how the actuator works:

In the beginning of a new cycle the capacitor Cb is fully charged to the maximum voltage and all the switches are open. This state is denoted by 123 in the state diagram 120.

When the up-going edge timing is reached, the switches S2 and S3 are closed and kept in this position until the inductor current returns to 0. This is split to two states 124 and 125 in the state diagram 120 (splitting into two states comes from a practical reason, to prevent detection of the second event iL<=thr_curr before the first event iL>thr_curr actually occurs)

The switches S2 and S3 are opened at the exact timing when the inductor current is 0 in order to prevent voltage spikes at the inductor's terminals. At this time the capacitive load Cm is fully charged and reaches its peak voltage. This state is denoted by 126 in the state diagram 120.

The state machine then waits for the down-going edge timing and closes S2 and S3 again—this time to get the capacitive load charge return into the capacitor Cb. Again, S2 and S3 are opened when the inductor current returns to 0. This is split to two states 127 and 128 in the state diagram 120 (splitting into two states comes from a practical reason, to prevent detection of the second event -iL<=thr_curr before the first event -iL>=thr_curr actually occurs)

Now the state machine needs to correct the voltages of the capacitive load and Cb and prepares them for the next cycle.

This is done by:

a) closing the switch S1 (to discharge to ground the remaining charge of the capacitive load). After a sufficient time the switch S1 can be opened (the capacitive load is discharged very fast). This starts in state 121 and continues during the states 122 and 123 in the state diagram 120.

b) Producing a current boosting pulse through the inductor L (by closing S4 and S5 for a pre-defined time Boost_Time)—state 121 in the state diagram 120, and directing it to Cb by switching-off S4 and switching-on S3—state 122 in the state diagram 120. Again, switches S5 and S3 are opened just when the inductor current returns to 0.

Now the circuit is in its initial conditions and it is ready for starting the next capacitive load voltage cycle. This state is denoted by 123 in the state diagram 120.

Figure 5:
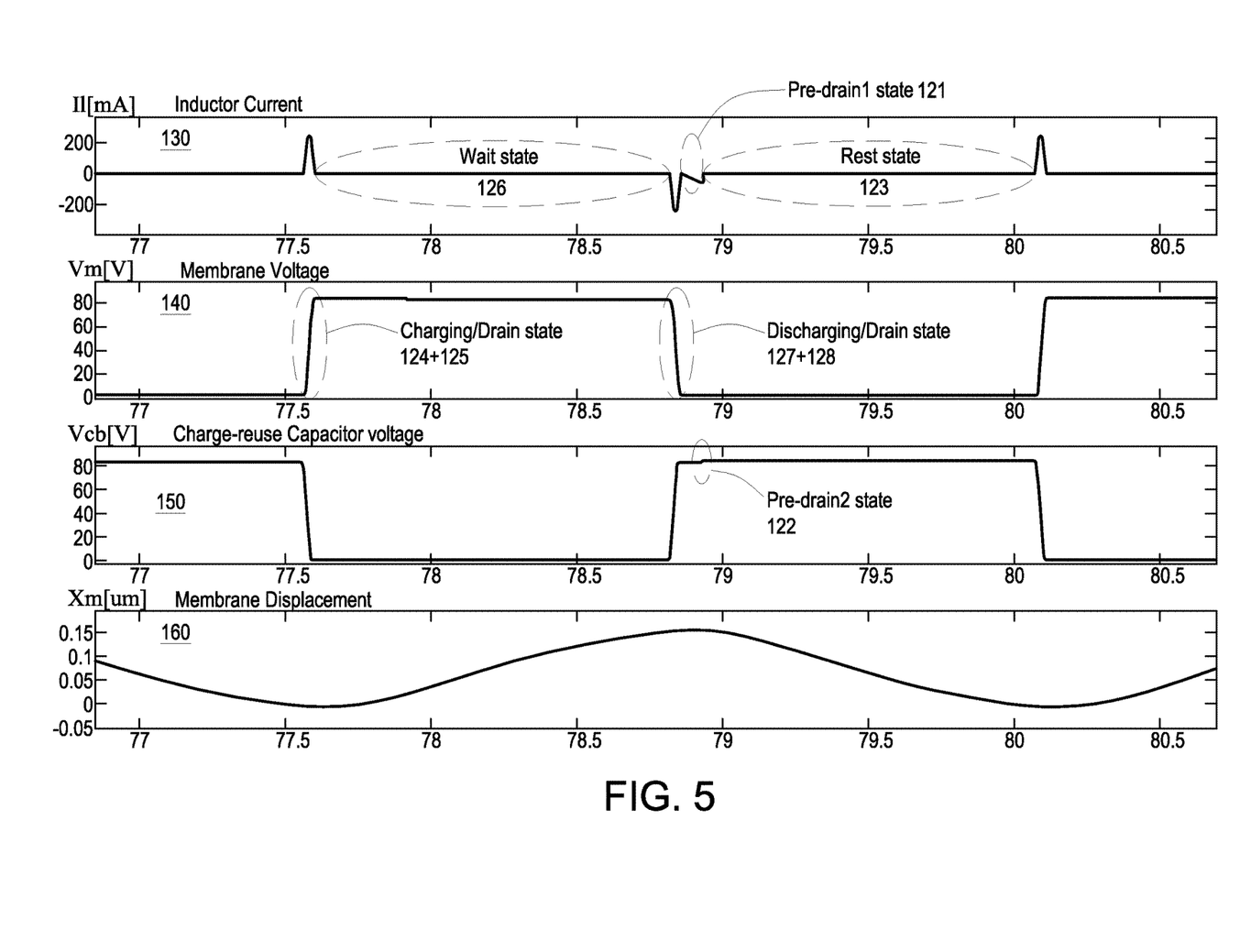
FIG. 5 is a timing diagram according to an embodiment of the invention.

FIG. 5 includes waveform 130 that is indicative of the inductance current (current through the inductor), a waveform 140 that illustrates the second capacitive load voltage, a waveform 150 that illustrates the first capacitive load voltage and a graph 160 that illustrates oscillations of the membrane (the second capacitive load) according to an embodiment of the invention.

The device executes multiple repetitions of various steps and FIG. 5 illustrates wait state 126, rest state 123, pre-drain1 state 121, pre-drain 2 state 122, charging/drain states 124 and 125, and dis-charging/sink states 127 and 128.

According to an embodiment of the invention the Pre-drain1 state 121 and the Pre-drain2 state 122 can be extended from a single pulse to multiple smaller pulses so as to bring the first capacitive load voltage to the target maximum voltage in a closed loop. This way the capacitive load amplitude can be determined by a direct reference voltage rather than by indirectly setting the Boost_programmable Time constant.

According to an embodiment of the invention the closed loop can also be implemented to automatically setting the Boost_Time by inspecting the capacitive load amplitude. This requires taking multiple samples of the capacitive load peak-voltage (from a number of sequential capacitive load voltage pulses) taking into account the amplitude response time, and then deciding how to change the Boost_Time variable if needed to. This loop can be implemented in the analog domain or inside the controller algorithm using an appropriate ADC that measures the capacitive load amplitude.

According to an embodiment of the invention switches S1, S2, S3, S4, and S5 may be implemented in different ways. In particular, some of them may include some logic that facilitates the state-machine job. As an example, switches S2 and S3 can be assisted by parallel diodes that can stop the inductors current when it is going to change direction (i.e. when it returns to 0). In this way the state machine does not need to turn-off the switches in the exact time (i.e. in a nanoseconds granularity), but can do it several nanoseconds or tens of nanoseconds before reaching 0 current.

According to an embodiment of the invention multiple synchronized capacitive loads can be actuated using the inductor L, S4, S5, and state machine as common components for all the capacitive loads. This way each capacitive load may have its rise and fall timings independently of the other capacitive loads (as long as there are no timing contentions).

Figure 6:
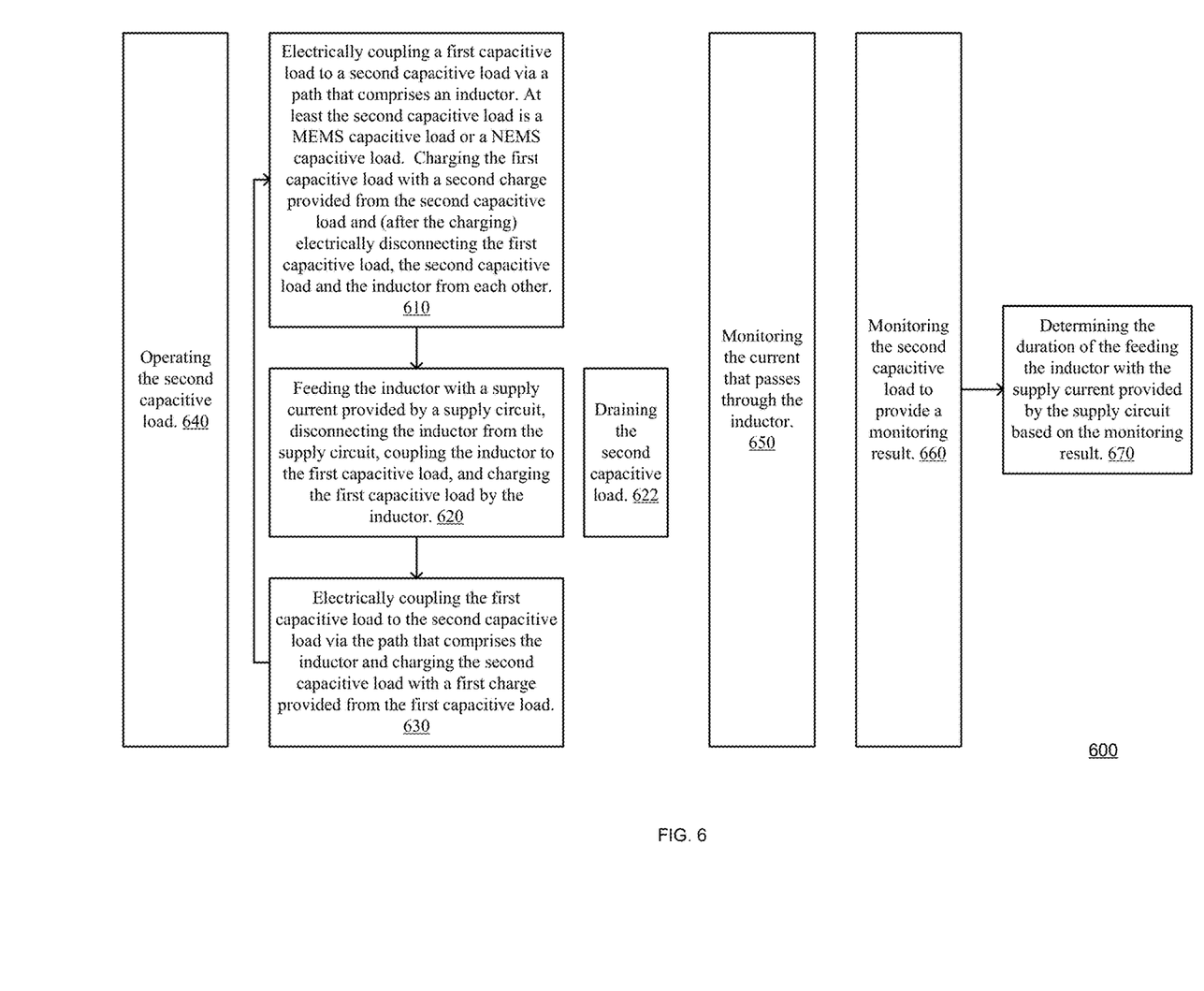
FIG. 6 illustrates a method according to an embodiment of the invention.

FIG. 6 illustrates a method 600 according to an embodiment of the invention.

Method 600 may start by step 610 of electrically coupling a first capacitive load to a second capacitive load via a path that comprises an inductor; wherein the second capacitive load is a Microelectromechanical systems (MEMS) capacitive load or a Nanoelectromechanical systems (NEMS) capacitive load; charging the first capacitive load with a second charge provided from the second capacitive load and (after the charging) electrically disconnecting the first capacitive load, the second capacitive load and the inductor from each other.

Step 610 may include (a) closing a third switch that is coupled between the first capacitive load and the inductor and (b) closing a second switch that is coupled between the inductor and the second capacitive load.

Step 610 may be followed by step 620 of feeding the inductor with a supply current provided by a supply circuit, disconnecting the inductor from the supply circuit, coupling the inductor to the first capacitive load, and charging the first capacitive load by the inductor.

Step 620 may include electrically disconnecting of the first capacitive load, the second capacitive load and the inductor from each other occurs when an actual value or an estimated value of a current that passes through the inductor is substantially zero.

Step 620 may include or may be preceded by coupling one end of the inductor to the supply circuit and by coupling another end of the inductor to the ground.

According to an embodiment of the invention the supply circuit may include a voltage supply unit. The voltage supply unit is arranged to output a supply voltage that has a maximal value that is referred to as a maximal supply voltage.

By using the inductor to charge the first capacitive load the voltage of the first capacitive load at the end of step 620 (when reaching a steady state) may exceed (and even well exceed) the maximal supply voltage.

Step 620 may compensate for charge losses that occurred during step 610 and/or charge losses that will occur during step 630.

Steps 610 and 620 may be executed during a first setup phase of the device.

Step 620 may be followed by step 630 of electrically coupling the first capacitive load to the second capacitive load via the path that comprises the inductor and charging the second capacitive load with a first charge provided from the first capacitive load.

At the end of step 630 the voltage developed on the second capacitive load (when reaching a steady state) may also exceed (and even well exceed) the maximal supply voltage.

For example, using a maximal supply voltage of about 3 volts the voltage developed on the first capacitive load and the voltage developed on the second capacitive load (when reaching a steady state) may equal or exceed eighty volts.

Because the maximal supply voltage is relatively low the method may include multiple iterations of the first and second setup phases during which the voltage developed on the first and second capacitive loads (at the end of steps 630 and 620 respectively) increases until reaching the so-called steady state value.

Step 630 may include charging of the second capacitive load with the first charge ends when an actual value or an estimated value of a current that passes through the inductor is substantially zero. Step 630 may be followed by step 610.

Step 630 may be executed during a second setup phase of the device.

Method 600 may include step 622 of draining the second capacitive load. Step 622 may be executed in an at least partially overlapping manner with the charging of the first capacitive load by the inductor.

Step 622 may include closing a first switch that is coupled between the second capacitive load and the ground.

Method 600 may also include step 640 of operating the second capacitive load. Step 640 may include, for example, vibrating a membrane of one or more speakers, modulating ultrasonic waves outputted by a membrane, moving objects by an actuator, and the like.

Step 640 may be executed in parallel to the execution of steps 610, 620 and 630.

Alternatively, step 640 may be executed between the execution of step 620 and step 630 and/or between the execution of step 630 and the execution of the next repetition of step 610.

Method 600 may include step 650 of monitoring the current that passes through the inductor. The outcome of step 650 may affect step 620 and/or step 630.

Method 600 may include step 660 of monitoring the second capacitive load to provide a monitoring result.

Step 660 may be followed by step 670 of determining the duration of feeding the inductor with a supply current provided by a supply circuit based on the monitoring result. Longer durations will charge the first and second capacitive loads to higher charge and/or voltage levels.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for charge-reuse, the method comprises:
performing multiple repetitions of the steps of:
operating a second capacitive load while the second capacitive load is disconnected from a first capacitive load; wherein the second capacitive load is a Microelectromechanical systems (MEMS) capacitive load or a Nanoelectromechanical systems (NEMS) capacitive load;
electrically coupling a first capacitive load to a second capacitive load via a path that comprises an inductor; charging the first capacitive load with a second charge provided from the second capacitive load;
electrically disconnecting the first capacitive load, the second capacitive load and the inductor from each other;
feeding the inductor with a supply current provided by a supply circuit;
disconnecting the inductor from the supply circuit and coupling the inductor to the first capacitive load;

charging the first capacitive load by the inductor;
electrically coupling the first capacitive load to the second capacitive load via the path that comprises the inductor;
charging the second capacitive load with a first charge provided from the first capacitive load; and
operating the second capacitive load while the second capacitive load is disconnected from the first capacitive load.

2. The method according to claim 1 further comprising draining the second capacitive load; wherein the draining of the second capacitive load and the charging of the first capacitive load by the inductor at least partially overlap.

3. The method according to claim 2 wherein the draining of the second capacitive load comprising closing a first switch that is coupled between the second capacitive load and the ground.

4. The method according to claim 1 wherein the electrically disconnecting of the first capacitive load, the second capacitive load and the inductor from each other occurs when an actual value or an estimated value of a current that passes through the inductor is substantially zero.

5. The method according to claim 4 comprising monitoring the current that passes through the inductor.

6. The method according to claim 1 wherein the charging of the second capacitive load with the first charge ends when an actual value or an estimated value of a current that passes through the inductor is substantially zero.

7. The method according to claim 6 comprising monitoring the current that passes through the inductor.

8. The method according to claim 1 comprising monitoring the second capacitive load to provide a monitoring result; and determining a duration of the feeding of the inductor with the supply current provided by the supply circuit based on the monitoring result.

9. The method according to claim 1 wherein the feeding of the inductor with the supply current provided by the supply circuit is preceded by coupling one end of the inductor to the supply circuit and by coupling another end of the inductor to the ground.

10. The method according to claim 1 wherein the electrically coupling of the first capacitive load to the second capacitive load via the path that comprises the inductor comprises (a) closing a third switch that is coupled between the first capacitive load and the inductor and (b) closing a second switch that is coupled between the inductor and the second capacitive load; and
wherein the electrically disconnecting the first capacitive load, the second capacitive load and the inductor from each other comprises opening the second switch and opening the third switch.

11. The method according to claim 1, wherein a steady state voltage across the first capacitive load exceeds a maximal supply voltage provided by a voltage supply unit of the supply circuit.

12. A device having charge-reuse capabilities, wherein the device comprises:
a first capacitive load;
a second capacitive load; wherein the second capacitive load is a Microelectromechanical systems (MEMS) capacitive load or a Nanoelectromechanical systems (NEMS) capacitive load;
an inductor;
a coupling circuit;
wherein the device is arranged to perform multiple repetitions of an operational phase and a sequence that comprises a first setup phase and a second setup phase;

wherein during the first setup phase:
the coupling circuit is arranged to couple the first capacitive load to the second capacitive load via a path that comprises an inductor;
the second capacitive load is arranged to be charged, via the path the comprises the inductor, by a first charge that is provided from the first capacitive load;
following the charging of the first capacitive load by the first charge, the coupling circuit is configured to electrically disconnect the first capacitive load, the second capacitive load and the inductor from each other;
the coupling circuit is arranged to couple the inductor to a supply circuit;
the supply circuit is arranged to feed the inductor with a supply current provided;
the coupling circuit is arranged to disconnect the inductor from the supply circuit and couple the inductor to the first capacitive load;
the inductor is arranged to charge the first capacitive load by the inductor;
wherein during the second setup phase:
the coupling circuit is arranged to electrically couple the first capacitive load to the second capacitive load via the path that comprises the inductor; and
the first capacitive load is arranged to charge the second capacitive load with a first charge.

13. The device according to claim 12, wherein during the first setup phase the coupling circuit is arranged to drain the second capacitive load; wherein a draining of the second capacitive load and a charging of the first capacitive load by the inductor at least partially overlap.

14. The device according to claim 13, wherein the coupling circuit comprises a first switch that once is closed couples the second capacitive load to the ground.

15. The device according to claim 12, wherein the coupling circuit is arranged to electrically disconnect of the first capacitive load, the second capacitive load and the inductor from each other occurs when an actual value or an estimated value of a current that passes through the inductor is substantially zero.

16. The device according to claim 15, comprising a monitor for monitoring a current that passes through the inductor.

17. The device according to claim 12, wherein the coupling circuit is arranged to end a charging of the second capacitive load with the first charge when an actual value or an estimated value of a current that passes through the inductor is substantially zero.

18. The device according to claim 17, comprising a monitor for monitoring a current that passes through the inductor.

19. The device according to claim 12, comprising:
a monitor for monitoring the second capacitive load to provide a monitoring result; and
a controller for determining a duration of feeding the inductor with the supply current provided by the supply circuit based on the monitoring result.

20. The device according to claim 12, wherein the coupling circuit is arranged to couple one end of the inductor to the supply circuit and couple another end of the inductor to the ground before feeding the inductor with the supply current.

21. The device according to claim 12, wherein the coupling circuit is arranged to electrically couple of the first capacitive load to the second capacitive load via the path that comprises the inductor by (a) closing a third switch that is coupled between the first capacitive load and the inductor and (b) closing a second switch that is coupled between the inductor and the second capacitive load; and wherein wherein the coupling circuit is arranged to electrically disconnect the first capacitive load, the second capacitive load and the inductor from each other by opening the second switch and opening the third switch.

22. The device according to claim 12, wherein a steady state voltage across the first capacitive load exceeds a maximal supply voltage provided by a voltage supply unit of the supply circuit.

* * * * *